July 18, 1933.                    P. RILEY                    1,918,490
SUSPENSION MEANS FOR MOTOR VEHICLE ENGINES OR GEAR BOXES
Filed April 13, 1933
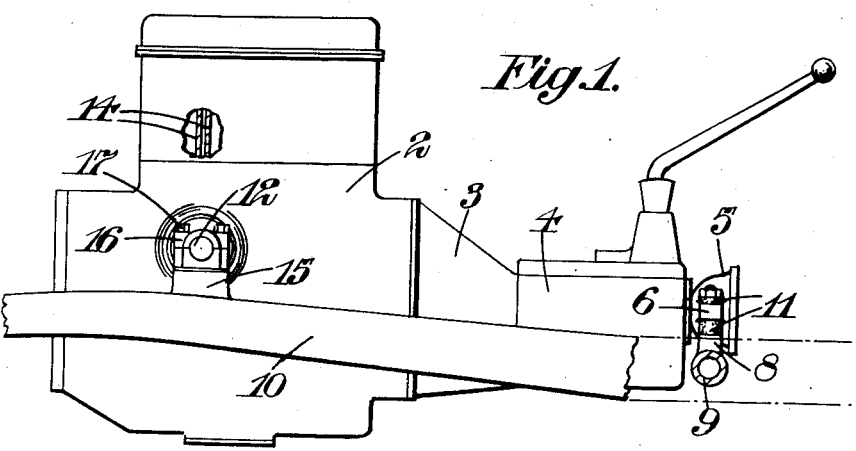
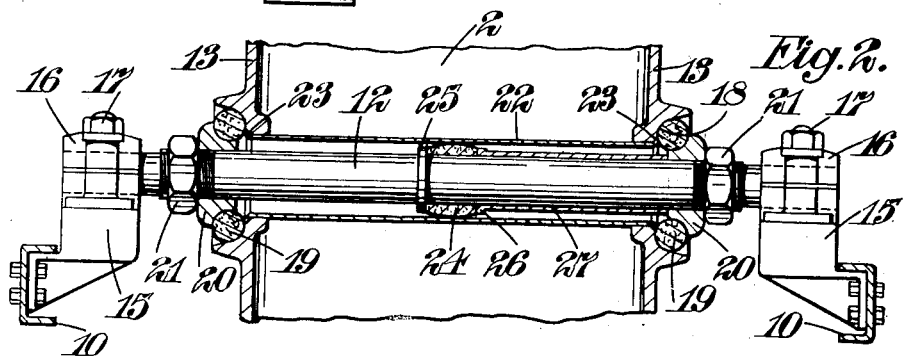
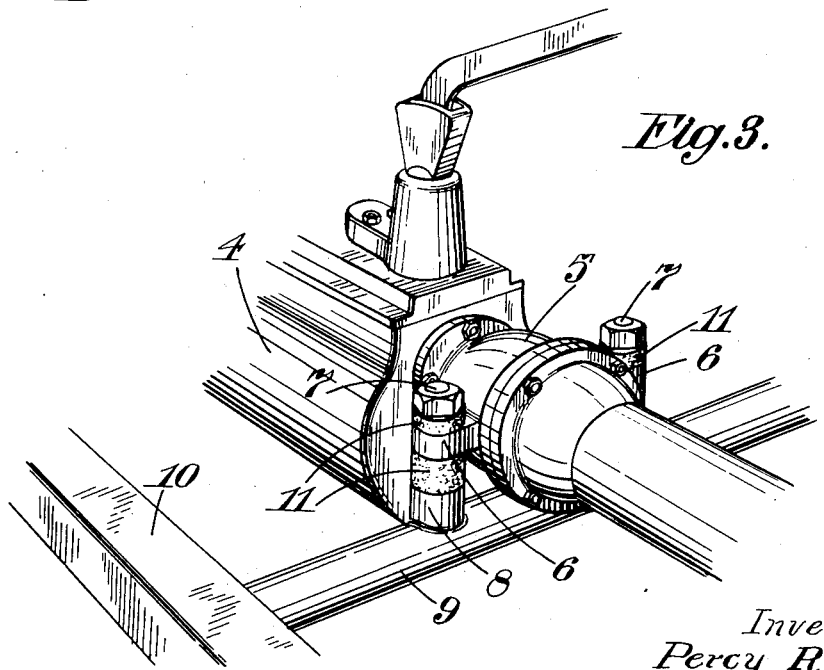
Inventor:
Percy Riley,
By Mawhinney & Mawhinney,
Attys.

Patented July 18, 1933

1,918,490

UNITED STATES PATENT OFFICE

PERCY RILEY, OF COVENTRY, ENGLAND

SUSPENSION MEANS FOR MOTOR-VEHICLE ENGINES OR GEAR-BOXES

Application filed April 13, 1933, Serial No. 666,031, and in Great Britain November 21, 1932.

This invention relates to motor-vehicles, and has for its main object to provide an improved resilient suspension means for the engine or gear-box unit which will allow such movement of the unit as is necessary in order that torque re-action or other vibrations may be absorbed without being transmitted through to the chassis frame.

The invention relates particularly to suspension means where a bar interconnecting spaced frame members engages opposite walls of the unit through resilient means, as is described in British Patent specification No. 270519.

According to this invention, the bar has between the resilient means and within the unit a rocking engagement with the latter. In a preferred arrangement, where the bar extends through the crank-case of the engine, it has midway between the resilient means, through which opposite walls of the crankcase are supported from the bar, a rocking engagement with means rigidly supported by the crank-case. These means rigidly supported by the crank-case conveniently take the form of a tube carried by the walls of the crank-case, the tube ends being entered into holes therein, in which case the bar may carry centrally a parti-spherical collar internally engaging the tube. This parti-spherical collar is preferably of hard rubber, the resilient means being soft rubber rings, and provision may be made for its axial adjustment with respect to the bar.

In the accompanying drawing:—

Figure 1 is an elevation of an engine and gear-box unit suspended according to the invention;

Figure 2 is a transverse section, to a larger scale, taken through the forward suspension; and Figure 3 is a perspective view of the rear mounting.

In the construction illustrated, the engine 2, clutch 3 and gear-box 4 constitute an integral unit incorporating at the rear end of the gear-box a casing 5 for a universal joint, this casing being shown as forming the rear support. For this purpose it has transverse ears 6, 6 mounted with clearance upon bolts 7, 7 screwed into bosses 8 on a transverse bar 9 interconnecting the chassis longitudinals 10, 10, resilient rings 11, 11 being arranged on opposite sides of the ears.

The forward suspension means, which is that to which the present invention particularly relates, includes in this case a crossbar 12 rigidly interconnecting the chassis longitudinals 10, 10 and passing through the opposite walls 13, 13 of the crank-case. Figure 1 is broken away to show the interiors of the two front cylinders 14, 14, and it will be noted that the axis of the cross-bar 12 is in the vertical transverse plane between these two cylinders, so that the bar will be just clear of the connecting rods for the associated pistons. The drawing also shows the ends of the cross-bar as being adjustably held upon brackets 15, 15 by plates 16, 16 secured by nuts or bolts 17, 17, the brackets 15 being rigidly bolted to the chassis longitudinals.

The crank-case walls, where the bar 12 passes through them, are formed with external concave faces 18 which receive resilient rings 19, 19 of relatively soft rubber, these being outwardly and internally gripped by aluminium plugs 20, 20 formed with co-acting concave surfaces and positioned by nuts 21, 21 engaging screw-threads near the ends of the bar.

Secured in the openings in the walls of the crank-case is a tube 22 which is rigidly supported from the crank-case walls by having its ends upset, as shown at 23. Centrally of the tube is arranged around the bar a collar 24 of hard rubber or other substance the surface of which is of parti-spherical shape and of a size to engage the tube internally. By this means a rocking engagement is established between the bar and the unit midway of the resilient rings, and in the interior of the unit. In the present instance the collar 24 is shown as being axially located by means of a flange 25 fast on the bar and a second flange 26 formed on a spacing sleeve 27 the outer end of which engages the adjacent end plug 20. Thus the collar can be adjusted, by movement of the bar and the use of a sleeve of different length if necessary, and the two nuts 21 can then be tightened up to exert equal pressures on the resilient rings.

It is found that by supporting engine units in this way torque re-action and other vibrations are absorbed by the suspension means in a very convenient manner, the units being able to partake of such movement as is desirable for this purpose, and thus these vibrations are not transmitted through to the chassis frame. The cross-bar moreover serves for strengthening the chassis frame.

What I claim as my invention and desire to secure by Letters Patent of the United States is:—

1. In a motor-vehicle having an engine and spaced frame members, a bar interconnecting said frame members, said bar engaging opposite walls of said engine through resilient means, and means between said resilient means and within said engine providing a rocking engagement between said engine and said bar.

2. In a motor-vehicle, an engine having a crank-case, chassis longitudinals, a bar interconnecting said chassis longitudinals, said bar passing through holes in opposite walls of said crank-case, resilient rings interposed between said bar and said walls, means rigidly supported by said crank-case, and means between said rings providing a rocking engagement between said bar and said rigidly-supported means.

3. An engine having a crank-case, a supporting bar extending through opposite walls of said crank-case, the bar engaging said opposite walls through resilient rings, a tube supported within the engine from said opposite walls, and a parti-spherical collar on said bar which internally engages said tube.

4. In a motor-vehicle having an engine and spaced frame members, a bar interconnecting said frame members, said bar engaging opposite walls of said engine through resilient means, and means between said resilient means and within said engine providing a rocking engagement between said engine and said bar, said resilient means being soft rubber rings and said rocking engagement means including a hard rubber member.

5. In a motor-vehicle having an engine and spaced frame members, a bar interconnecting said frame members, said bar engaging opposite walls of said engine through resilient means, and means between said resilient means and within said engine providing a rocking engagement between said engine and said bar, said rocking engagement being effected through a parti-spherical collar on said bar.

6. An internal-combustion engine having openings in opposite walls, said opposite walls being formed with external concave faces around said openings, a cross-bar extending through said openings, resilient rings encircling said bar and engaging said concave faces, plugs on said bar having concave faces engaging said rings, a parti-spherical collar on said bar between said rings, and a tube spaced around said bar and having its ends secured in said openings, said tube internally engaging said collar.

7. An internal-combustion engine having openings in opposite walls, said opposite walls being formed with external concave faces around said openings, a cross-bar extending through said openings, resilient rings encircling said bar and engaging said concave faces, plugs on said bar having concave faces engaging said rings, a parti-spherical collar on said bar between said rings, and a tube spaced around said bar and having its ends secured in said openings, said tube internally engaging said collar, and means axially locating said collar on said bar including a flange thereon on one side of said collar and a sleeve extending from the other side of said collar to the nearer of said plugs.

PERCY RILEY.